United States Patent [19]

Langlois

[11] Patent Number: 4,741,077

[45] Date of Patent: May 3, 1988

[54] END TERMINATIONS FOR CAPACITORS

[75] Inventor: Mark Langlois, Oro Valley, Ariz.

[73] Assignee: SFE Technologies, San Fernando, Calif.

[21] Appl. No.: 50,883

[22] Filed: May 15, 1987

[51] Int. Cl.⁴ .................. H01G 4/12; H01G 4/30
[52] U.S. Cl. .................. 29/25.42; 204/192.15; 204/192.17; 219/121 LJ
[58] Field of Search .......... 29/25.42, 90 R, 90 A; 204/192.15, 192.17; 219/121 LH, 121 LJ

[56] References Cited

U.S. PATENT DOCUMENTS

| | | | |
|---|---|---|---|
| 3,992,761 | 11/1976 | McElroy et al. | 29/25.42 |
| 4,584,629 | 4/1986 | Garcia et al. | 361/321 |
| 4,613,518 | 9/1986 | Ham et al. | 29/25.42 X |

FOREIGN PATENT DOCUMENTS

| | | | |
|---|---|---|---|
| 8100786 | 3/1981 | European Pat. Off. | 29/25.42 |
| 2824802 | 12/1979 | Fed. Rep. of Germany | 29/25.42 |
| 0019606 | 6/1978 | Japan | 29/25.42 |
| 2106714 | 4/1983 | United Kingdom | 29/25.42 |

Primary Examiner—Olik Chaudhuri
Attorney, Agent, or Firm—Christie, Parker & Hale

[57] ABSTRACT

A process for providing terminations at the ends of chips for multilayer capacitors such a MLC capacitors includes applying thin films of metallization at the opposite ends of each chip and over the surface of the chip between the ends, and thereafter removing a porton of the thin films of metallization material intermediate the ends, to provide a monolithic multilayer capacitor having proper metallized end terminations. Preferably, the thin films are applied to cover the entire surface of each chip by sputtering thin film material onto a batch of tumbling chips.

11 Claims, 3 Drawing Sheets

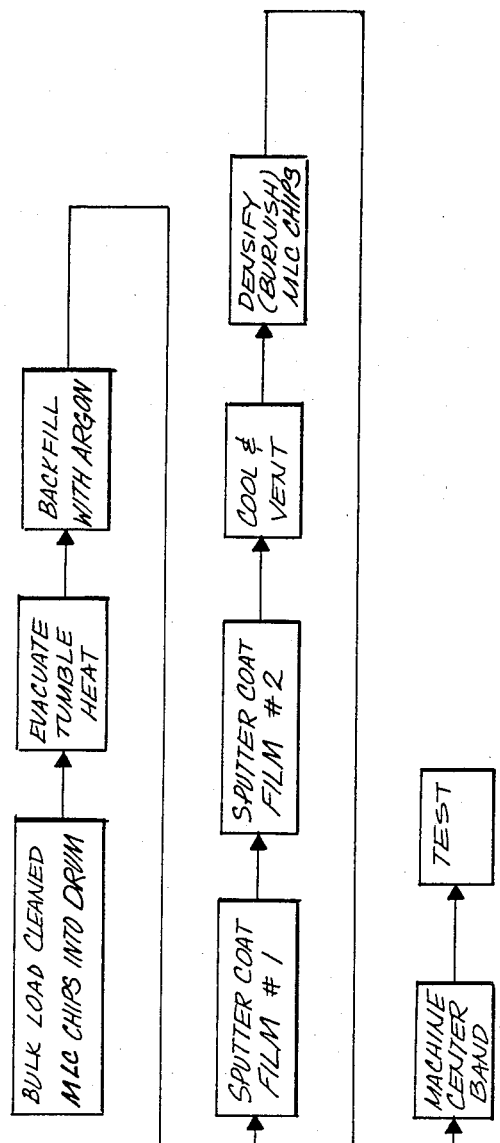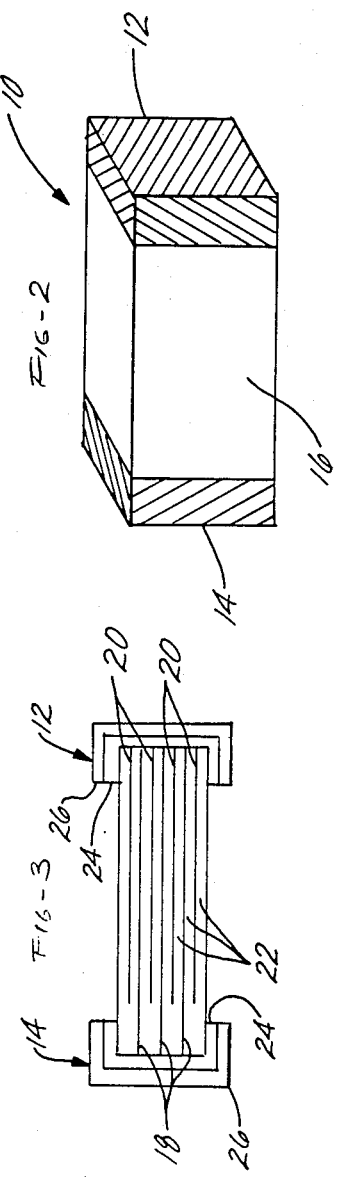

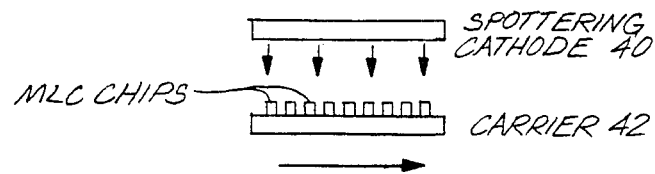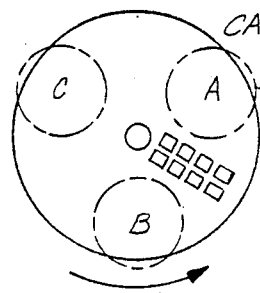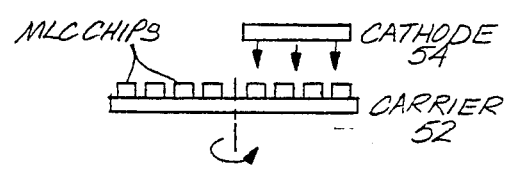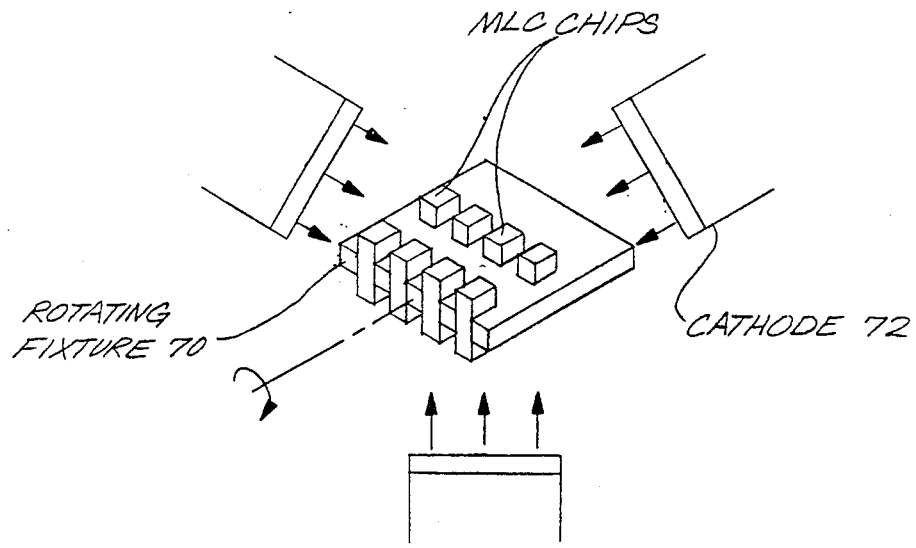

END TERMINATIONS FOR CAPACITORS

CROSS REFERENCE TO RELATED APPLICATION

This application is related to commonly assigned application Ser. No. 050,614 filed on May 15, 1987, entitled "Current-Limiting Thin Film Termination For Capacitors," the disclosure of which is hereby incorporated herein by reference.

BACKGROUND OF THE INVENTION

The present invention relates to monolithic multilayer capacitors and, in particular, to a method of making end terminations for a monolithic multilayer capacitor.

A monolithic multilayer capacitor includes a body portion, referred to herein as a "chip," and also includes a pair of end terminations. Such a capacitor has a stacked configuration in contrast to a wound configuration. In the stacked configuration, there are alternating conductive and dielectric layers, with the conductive layers defining first and second sets. These layers are contained in the chip. In the capacitor, all the conductive layers in the first set are electrically connected together at one end of the chip by one of the pair of end terminations; all the conductive layers in the second set are electrically connected together at the opposite end of the chip by the other of the pair of end terminations.

Various types of materials can be used to make a monolithic multilayer capacitor. When ceramic is used as the dielectric, the capacitor is referred to as a monolithic ceramic (MLC) capacitor. In an MLC capacitor, a platinum/palladium alloy is commonly used for the conductive layers. In other monolithic multilayer capacitors, any of various materials, including silver, gold, and platinum, is used for the conductive layers. In any case, the capacitor is functional only if at each of the opposite ends of the chip the respective end termination provides a good electrical connection to the edges of the conductive layers in the chip, such that all the conductive layers in one set cooperate as one electrode and all the conductive layers in the other set cooperate as another electrode.

Monolithic multilayer capacitors have many uses and have substantial commercial importance. A substantial amount of research, development, and design effort has been devoted to methods for manufacturing such capacitors, particularly to methods for providing the required end terminations.

One prior art approach that has been used to electrically connect such conductive layers together involves a liquid coating process. A representative example of this liquid coating process can be more particularly described in the concrete context of the manufacture of MLC capacitors. In this context, the prior art liquid coating process entails preparing an ink comprising silver and a glass frit for use as a coating material. In sequence, one end of the MLC chip is dipped into the ink, and later the opposite end is dipped into the ink. After dipping, the chip is placed in an oven and subjected to a firing cycle where the glass frit bonds to the ceramic and the silver in the ink mixture provides the electrical continuity and electrical termination joining the conductive layers within the chip and thus provides the end terminations for the resulting functional capacitor. A capacitor prepared in this manner can be used as a surface-mounted device; that is, the capacitor can be bonded to a printed circuit board by directly reflow soldering or by using conductive epoxy that electrically connects plated conductors on the board directly to the end terminations of the capacitor. Alternatively, a separate lead can be attached to the film at each end of the capacitor to provide a pair of leads for inserting into plated holes in a circuit board or for otherwise connecting the capacitor to the other electrical circuitry with which it is to be used.

For a surface-mounted capacitor, it is important that each end termination have a configuration such that the end termination not only covers the end of the chip but also forms a thin, surrounding band adjacent the end. This is important for two reasons. First, during surface mounting of the capacitor, the solder will "float" the capacitor slightly above the board, thereby providing clearance beneath the bottom surface of the capacitor and allowing use of cleaning fluids to remove residual flux. Second, the capacitor should be symmetrical so that it does not have to be specially oriented during the assembly operation preceding the soldering operation. If, instead of a surrounding band, the end termination had a strip portion covering only one surface, the capacitor would be asymmetrical and would have to be specially oriented during the assembly operation.

Various problems inhere in the foregoing prior art process. One of these problems relates to controlling the width of the band of termination material around the chip and, in addition, controlling the reaction and interaction between the materials which comprise the glass frit and the ceramic material that is used in the MLC capacitor. To provide a desired width for the band of termination material around the sides of the chip adjacent the end, it is necessary to control not only the actual depth of dipping and but also the rheology of the ink. In addition, it has been found that the rheology of the silver and glass frit ink changes with time and introduces another variable into the process.

Another problem arises from a particular phenomenon encountered in the firing cycle step of the process; that is, the glass in the ink tends to diffuse and come to the surface. When the glass comes to the surface, the glass severely hinders the solderability of the end termination material and likewise the platability of other metals on the end termination material.

An inadequate control of the reaction and interaction between the frit and the ceramic can cause further problems in both surface-mounted capacitors and capacitors that have leads attached to the end terminations. If the relationship between the ceramic and the frit is not properly controlled, the step of surface mounting or of attaching leads is frequently found to cause microfractures in the end termination film material which causes yet bigger fractures, failures and malfunctions.

Another problem relates to the expense involved in production operations such as the sequential ink-coating steps in which one end at a time of the MLC chip is dipped into the ink. These steps are not only time consuming but also difficult to carry out with miniature capacitors. The dimensions of such a miniature capacitor can be about 0.080" long, by 0.050" wide, by 0.050" thick. Another factor that adds to the cost of the capacitor is the cost of the noble metal, such as silver, that is used in the coating ink.

In addition to the above-described process, the prior art includes U.S. Pat. No. 3,992,761. This patent discloses an approach to the problem in a production operation of providing an individual termination at each end of many multilayer capacitor chips. The disclosed approach is to mount the capacitor bodies in a support sheet and encapsulate the support sheet and the capacitor bodies in a plastic block with the ends of the capacitor body being exposed at opposed surfaces of the block. According to the disclosed approach, the exposed ends of the capacitor bodies are simultaneously plated via an electroless plating process with a termination film and then with a solder film and the terminated capacitor bodies are thereafter removed from the block.

According to the disclosed approach, the way to extract the capacitors from the block is to place the block in a solvent bath until all of the plastic is dissolved to separate the individual capacitors from the block, and then, after the plastic has been completely dissolved, remove the capacitors from the solvent and then wash them to remove the solvent.

It is apparent that numerous disadvantages are involved in this disclosed approach. One such disadvantage is the introduction of additional assembly steps. These additional assembly steps include attaching the MLC chips to a support sheet and thereafter encapsulating the sheet and mounted chips in an encapsulating block and controlling the dimensions of the block so that the ends of the chips extend from opposite ends of the encapsulating block. Further, after the plating operations, the encapsulating body thereafter has to be removed, and the capacitors detached from the mounting sheet. Using such additional assembly and disassembly steps would inevitably entail associated expenses; further, using the disclosed approach entails electroless plating operations and associated material costs of the baths. Another disadvantage that appears is that the use of the solvent would have an adverse effect on the electrical characteristics of the end termination film and the capacitor.

Another prior art patent directed to a process for making end terminations is U.S. Pat. No. 4,613,518. Like the approach disclosed in U.S. Pat. No. 3,992,761, the process for making end terminations in accord with the disclosure of U.S. Pat. No. 4,613,518 involves a step of providing a partial body cover, in this case a thin coating of epoxy, before carrying out the step of forming the end terminations, in this case by vapor deposition of nickel.

As indicated by the foregoing background, there has existed a need for an improved process for making end terminations for a monolithic multilayer capacitor.

SUMMARY OF THE INVENTION

The present invention provides a new and extremely advantageous approach to the process of providing end terminations for a small multilayer capacitor such as an MLC capacitor. Rather than dipping just each end portion of the chip in ink or using a separate supporting element as a temporary cover over the main body of each of a group of the chips as they are immersed in an electroless plating bath or as they are otherwise metallized, the present invention provides for applying thin films of metallization at the opposite ends of each chip and over the surface of the chip between the ends, and thereafter removing a portion of the thin films of metallization material intermediate the ends, to provide a monolithic multilayer capacitor having proper metallized end terminations. Preferably, the thin films are applied to cover the entire surface of each chip by sputtering thin film material onto a batch of tumbling chips.

The invention can be defined in broad terms as a process for providing end terminations on a multilayer capacitor chip containing first and second sets of conductive layers and alternating dielectric layers, with each of the layers of the first set having an edge exposed at one end of the chip to enable connection to one of the end terminations to define an electrode, and with each of the layers of the second set having an edge exposed at the opposite end of the chip to enable connection to another of the end terminations to define another electrode. The process comprises the steps of sequentially forming a plurality of sputter-coated metallization films so that each sputter-coated metallization film not only overlays the opposite ends of the chip and but also extends between the opposite ends, and so that the first such formed metallization film is in direct contact with each of the edges of the conductive layers contained in the chip. Preferably, one of the sputter-coated films is a non-magnetic, nickel-copper alloy, and is sufficiently thick (approximately 5 microns) so that the coating will not dissolve in the course of a soldering operation in which the final capacitor is electrically connected to other circuitry. An advantage of the non-magnetic properties of the nickel-copper alloy is that use of the alloy is not incompatible with magnetic enhancement of the sputter-coating operation even though nickel is a component of the alloy. The sputter-coating can proceed more rapidly because of such magnetic enhancement, which can be achieved by using a conventional arrangement involving a so-called "magnetron sputter source." With such magnetic enhancement, the sputter-coated film can be built up in a reasonable amount of time (approximately 30 minutes) to the desired thickness, which is not so thick as to entail other problems such as lack of adhesion or stress.

Preferably, another one of the sputter-coated films is a tin-lead alloy, and this film covers the non-magnetic nickel alloy film. Preferably, this covering film is also approximately 5 microns thick for the reasons set out above concerning the thickness of the sputter-coated film of nickel alloy.

The process further includes the step of removing the metallization films from the chip intermediate its ends sufficiently to eliminate every direct-current conductive path around the outside of the chip from one end to the other, leaving the metallization films on and surrounding each end thereof for electrical connection of the capacitor to external electrical circuitry.

The invention can also be defined in terms of particularly preferred, advantageous features, and in a high-volume production context. In these terms, the invention is a process for producing an end termination at each opposite end of many multilayer capacitors, and comprises the steps of loading a plurality of capacitor chips to be terminated into an evacuable enclosure. Thereafter, the chips are heated, and tumbled by rotating the enclosure. While the chips are being heated and tumbled, the enclosure is evacuated to produce a vacuum suitable for sputtering material onto the chips. Thereafter, an inert gas is introduced into the enclosure, and, while the chips continue to tumble, a first metallic material is sputtered to form a sputter-coated metallization film covering the entire exterior surface of each of the chips. A second metallic material is thereafter sputtered while the chips are tumbling to form on each of the chips an outer sputter-coated metallization film also covering the entire exterior surface of each of the chips. The chips are thereafter burnished to render the deposited metallic films more solderable. The final step of the process is to remove from each chip the deposited metallization films covering the chip intermediate to its ends, leaving only the metallic coating on opposite ends of the resulting functional capacitors for electrical termination and connection of the capacitor to external electrical circuitry.

These and other distinguishing and advantageous features of the invention are described in detail below and recited in the appended claims.

DESCRIPTION OF THE DRAWINGS

FIG. 1 is a process flow diagram for the thin film end termination process in accord with the presently preferred practice of the present invention;

FIG. 2 is a perspective view of an MLC capacitor made by a process according to the present invention, showing the surrounding intermediate band area from which metallization has been removed, thus producing the delineated separate electrical termination ends;

FIG. 3 is a schematic sectional view of the MLC capacitor of FIG. 2, showing (in enlarged scale) the thin-film electrical termination ends that comprise sputter-coated metallization films at each of the opposite ends of the capacitor;

FIGS. 4 through 9 depict various arrangements for use in alternative ways to practice certain steps of the present invention, wherein FIG. 4 depicts an arrangement for causing chips to move in a linear fashion while receiving sputter-coated metallization films;

FIGS. 5 and 6 depict in plan and elevation views an arrangement for causing chips to move in an annular fashion while receiving sputter-coated metallization films;

FIG. 7 depicts an arrangement involving use of a rotating fixture while the chips receive sputter-coated metallization films;

FIG. 8 depicts an arrangement in which ion plating is achieved by evaporization and sputtering; and FIG. 9 depicts an arrangement in which a mesh drum is used.

DESCRIPTION OF SPECIFIC EMBODIMENTS

Figure 8:
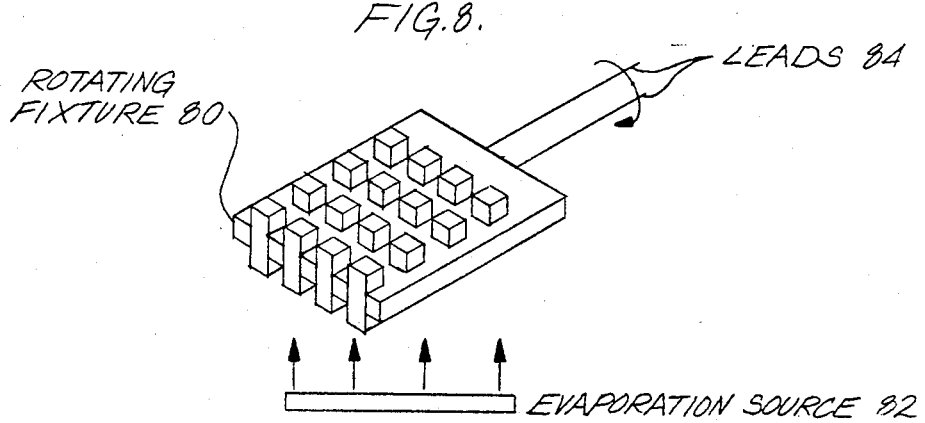

A flow diagram of the presently preferred thin film end termination process according to the present invention is illustrated in FIG. 1. As shown therein, the components that are to be provided with end terminations in the preferred practice of this invention are monolithic multilayer ceramic (MLC) capacitor chips. The MLC chips are first cleaned to remove contamination and impurities from their surfaces. These chips are bulk loaded into a drum suitable for use in low-pressure sputtering operations. Such suitable drums are commonly used in a variety of such low-pressure sputtering operations. The drum is then evacuated and heat is applied to the drum while the chips in the drum are tumbled. Typically, the pressure in the drum is reduced to approximately $10^{-6}$ Torr. The heat applied to the drum raises the temperature of the tumbling chips to de-gas (remove water, mainly) the chips and to take advantage of the well-known fact that sputtering operations are improved by having relatively hot surfaces to receive the sputter coating. A suitable temperature for the chips is 200° C. After the drum has been heated to the proper temperature and the desired level of vacuum has been achieved, a flow of argon gas is backfilled into the drum to provide an inert gas atmosphere in the enclosure. A sufficient flow of argon is introduced into the drum to increase the pressure in the evacuated drum to a range of between 1 to $5 \times 10^{-3}$ Torr.

The MLC chips are now ready to receive the first coating of a conductive material which is one of the components of the end termination.

A suitable arrangement is provided for carrying out sputtering operations within the drum. One suitable arrangement involves disposing a target plate (also called a sputtering cathode) within the drum, and wiring the target plate to an external high voltage source to charge the target plate negatively relative to the drum. As is well known, a gas such as argon within such a drum becomes ionized as a result of the high potential difference, so as to become a plasma source of ions that bombard the target and cause the target to act as a sputtering gun. In the specific process practice being described, the target plate used in the sputtering operation to produce the first coating on the chips is a non-magnetic, nickel-copper alloy. A particularly preferred such alloy is commercially available and relatively inexpensive; that is, Monel Alloy #400. Permanent magnets disposed on the back side of the target plate provide for magnetically enhancing the sputtering operation. Because the target plate is made of the non-magnetic alloy, its nickel component does not interfere with the use of the permanent magnets to provide for magnetically enhancing the sputtering operation.

As the chips are tumbled, a sufficient quantity of nickel-copper alloy is sputter coated onto the chips to achieve a deposition to a uniform thickness of 5 microns (50,000 angstroms) of non-magnetic nickel-copper alloy over the entire exterior surface of each of the MLC chips in the drum. Satisfactory coating of the first film of the end-termination material is typically achieved in a period of 60 minutes.

After a uniform coating of the non-magnetic nickel-copper alloy has been achieved to the desired thickness of five microns, a sputtering gun is then utilized to form a second film or component of the end termination. In this case, the material utilized is a tin-lead alloy and again the sputtering operation takes place while the MLC chips are being tumbled, so that a uniform coating to a thickness of 5 microns (50,000 angstroms) of the tin-lead alloy is uniformly deposited over the entire surface of each of the MLC chips in the drum. Again, typically the process of achieving a deposition film to a depth or thickness of five microns is achieved in approximately 60 minutes. When the desired 5 micron coating of tin-lead alloy on the MLC chips has been achieved, the sputtering gun is cut off.

In addition to forming two sputter-coated films as described above, it is possible and can be highly advantageous, particularly with respect to a capacitor like an MLC capacitor, to form additional sputter-coated films to provide the features disclosed in the related application cross referenced above.

After forming all the sputter-coated films, and preparatory to the next step, the drum is cooled and vented to lower the temperature to room temperature and the pressure to atmospheric pressure.

The next step in the process is to densify or burnish the MLC chips. In the presently preferred practice of the process, a media such as a ceramic tumbling media, walnut shells, or stone media is introduced into the drum and tumbled with the MLC chips. The surface contact of the media material with the MLC chips has the effect of burnishing—that is, smoothing and polishing—the dull tin-lead second coating, making it significantly more receptive to solder and negating the need for reflow soldering of the final MLC capacitors. The burnishing tumbling step is carried out in a separate tumbling drum after the sputter-coated MLC chips have been removed from the sputtering drum.

Following the burnishing step, the MLC chips are then removed from the tumbling drum and each of the chips is machined by abrasive machining, laser trimming, or a jet of high-pressure water to remove the metallization from the center of the chips, leaving only the end portions of the chips coated with the end termination combination films of the nickel alloy and tin-lead, whereby each defines a functional MLC capacitor. That is, there is no direct-current conductive path around the outside of the MLC capacitor from one end to the other, and the metallization films on each end enable electrical connection of the capacitor to external electrical circuitry.

The MLC capacitor illustrated in FIG. 2 shows a capacitor 10 prepared according to the present invention after it has been subject to machining removal of the central band of metallization which had previously been sputtered onto the entire MLC capacitor. This removal leaves only the end portions 12, 14 of the metallization covering the MLC capacitor at opposite ends, with the surrounding ceramic surface 16 of the intermediate portion of the capacitor being now uncovered.

A schematic sectional view of an MLC capacitor produced by using a process in accord with the present invention is shown in FIG. 3. As FIG. 3 illustrates, a first set 18 and a second set 20 of the electrode-defining conductive films of the capacitor extend in parallel and in an alternating fashion. The first set 18 of electrode-defining conductive films of the MLC capacitor are electrically connected together at their edges by the metallization termination 14 at one end of the MLC capacitor, and the second set 20 of electrode-defining conductive films are electrically connected together at their edges by the metallization termination 12 at the opposite end of the MLC capacitor. The ceramic dielectric layers 22 between the electrode-defining layers of the capacitor are also shown in FIG. 3. The components of the metallization terminations 12 and 14 are shown on an enlarged scale for clarity. These components are the nickel-copper alloy film 24 and the tin-lead film 26 sputtered on top of the nickel-copper alloy film.

An alternate way to perform the machining step to remove the sputter-coated material from the intermediate surface portions of the MLC chip is to use an abrasive gun to direct abrasive material at such portions. Use of such abrasives is very effective in removing the material without damaging the MLC capacitor because it has been found that the ceramic material utilized in the MLC capacitor is highly resistant to the abrasive. In addition to abrasive machining, it has also been found that the sputter-coated material in the position of the MLC intermediate the bands of end termination material can be removed by laser trimming.

With reference to FIGS. 4 through 9, there will now be described various arrangements for use in alternative ways to practice certain steps of the present invention.

As to the arrangement depicted in FIG. 4, this concerns an arrangement for use in causing the MLC chips to move in a linear fashion while receiving a sputter-coated metallization film. FIG. 4 shows a sputtering cathode 40 and a carrier 42, with a horizontal arrow indicating the direction of linear motion of the carrier relative to the sputtering cathode 40. The MLC chips are shown atop the carrier, exposed to the sputtering cathode so that the upwardly facing surface and all the side-facing surfaces of each MLC chip has formed on it a sputter-coated metallization film of the required thickness. After the outermost sputter-coated metallization film is formed, each chip is further processed as described above to remove such coating as would cause a direct-current path on the outside of the chip between the terminating ends.

As to the arrangement shown in FIGS. 5 and 6, these concern an arrangement for use in causing the MLC chips to move in an annular fashion while receiving sputter-coated metallization films. FIGS. 5 and 6 show a disk-shaped, rotating carrier 52, causing annular motion of MLC chips on the carrier, relative to sputtering cathodes such as cathode 54. The MLC chips are shown atop the carrier. They may be bulk loaded, i.e., poured, onto the carrier or they may be held in a specific orientation by appropriate fixturing. As the disk-shaped carrier rotates slowly under the sputtering cathodes, the multiple films are obtained by sequentially energizing the desired cathode. In each step of this sequence, each MLC chip is exposed to the sputtering cathode so that the upwardly facing surface and all the side-facing surfaces of each MLC chip has formed on it a sputter-coated metallization film of the required thickness. After the outermost sputter-coated film is formed, each chip is further processed as described above to remove such coating as would cause a direct-current path on the outside of the chip between the terminating ends.

As to the arrangement shown in FIG. 7, this concerns an arrangement involving a rotating fixture for causing the MLC chips to move relative to an energized sputtering cathode while receiving each sputter-coated metallization film. FIG. 7 shows a rotating fixture 70, and multiple sputtering cathodes such as cathode 72, one of which at a time is energized. The sequence involved with this arrangement is, as with the annular-motion arrangement, to energize the cathodes in sequence as each additional film is to be formed, and then to further process the chips into functional MLC capacitors by the removing such portion of the film coatings as would cause an undesired direct-current path.

As to the arrangement shown in FIG. 8, this concerns an arrangement involving a rotating fixture 80 for causing the MLC chips to move relative to an evaporation source 82 in an Argon atmosphere in the range of about 30 to 50 microns. The rotating fixture 80 is provided with leads 84 for connection to an external source (not shown) of rf potential. Use of this arrangement provides evaporation and sputtering at the same time to produce films that are dense and have high adhesion.

Figure 9:
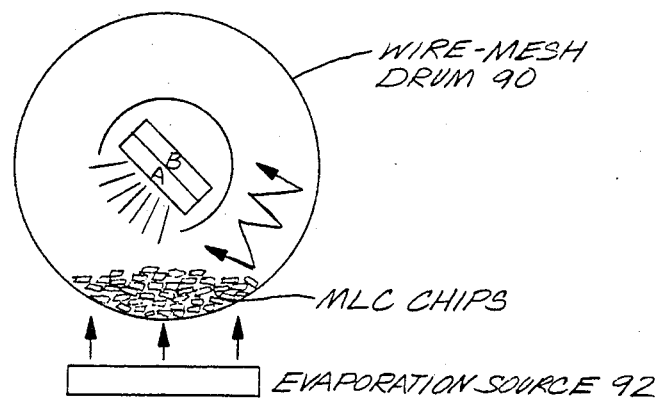

As to the arrangement shown in FIG. 9, this concerns an arrangement involving a wire-mesh drum 90 in which the MLC chips tumble. An evaporation source 92 is provided, and the wire-mesh drum is electrically connected to an external source of negative potential. By making the drum out of wire mesh, applying a negative potential to it as well as to the cathode (and cylindrical shield), an arrangement is provided that is known as a hollow cathode where secondary electrons become trapped between the screen and the cathode. This greatly increases the degree of ionization in the plasma and enables use of the evaporation source 92 to provide for ion plating the MLC chips with tin-lead. This is a very high-rate, high-quality method of coating with low-melting point alloys.

Other useful techniques that can be used in the practice of this invention are to heat the MLC chips by bias sputtering or electron bombardment, to provide the desired heating to cause the temperature of the MLC chips to reach the desired elevated temperature of about 200° C. To provide for such bias sputtering, a potential (either negative direct current or rf) is applied to the substrates during deposition. To provide for such electron bombardment, there can be placed a positive DC potential on the substrates (or fixture or drum), thereby defining an anode. In the presence of a plasma, the free electrons will accelerate to the anode and cause heating.

The above-described alternatives and modifications are illustrated of the broad scope of the present invention. As to the advantages of the present invention, these include the ability to create end terminations on MLC capacitors in an essentially uninterrupted operation. Because of the use of sputtering and abrasives, the entire operation is closely controllable to ensure high yields and high reliability with relatively few rejects. The result is a pair of end terminations for an MLC capacitor, each of which is extremely resistant to diffusion in liquid solder and which have been produced entirely without any need for plating at any step during the process. The process is also highly advantageous because the dimensions of the end termination material are easily controllable, whereas in the thickfilm approaches the rheology of the inks are such that the processes are characterized by instability and difficulties in holding dimensions within error tolerance limits.

Another important advantage of this invention is that it provides an end termination which, because of its low thermal mass and small thickness, provides greatly enhanced immunity to thermally induced damage, such as has occurred during soldering or thermal cycling with end terminations produced by thick film approaches.

What is claimed is:

1. A process for providing end terminations on a multilayer capacitor chip containing first and second sets of conductive layers and alternating dielectric layers, with each of the layers of the first set having an edge exposed at one end of the chip to enable connection to one of the end terminations to define an electrode, and with each of the layers of the second set having an edge exposed at the opposite end of the chip to enable connection to another of the end terminations to define another electrode, the process comprising the steps of:
   (1) sequentially forming a plurality of sputter-coated metallization films so that each such film covers the opposite ends of the chip and extends between the opposite ends, and so that the first such formed film is in direct contact with each of the edges of the conductive layers contained in the chip; and
   (2) removing the metallization films from the chip intermediate its ends sufficiently to eliminate every direct-current conductive path around the outside of the chip from one end to the other, leaving the metallization films on and surrounding each end thereof for electrical connection of the resulting capacitor to external electrical circuitry.

2. A process according to claim 1 wherein one of the metallization films is a non-magnetic nickel alloy.

3. A process according to claim 2 wherein one of the metallization films is a tin-lead alloy covering the non-magnetic nickel alloy metallization film.

4. A process according to claim 1, and further including the step of tumbling the chip with an abrasive media after forming the sputter-coated metallization films and before removing the metallization films between the ends.

5. A process according to claim 1, wherein the step of sequentially forming the sputter-coated metallization films includes tumbling the chip while sputtering metallic material to form a sputter-coated film covering the entire exterior surface of the chip.

6. A process for providing end terminations on each of a plurality of multilayer capacitor chips, comprising the steps of:
   (1) loading a plurality of multilayer capacitor chips to be terminated into an evacuable enclosure;
   (2) heating the chips;
   (3) rotating the enclosure to tumble the chips;
   (4) evacuating the enclosure to produce a vacuum suitable for sputtering;
   (5) introducing an inert gas into said enclosure;
   (6) sputtering a first metallic material while the chips are tumbling to form on each of the chips a sputter-coated metallization film covering its entire exterior surface;
   (7) sputtering a second metallic material while the chips are tumbling to form on each of the chips an outer sputter-coated metallization film covering its entire exterior surface;
   (8) removing the sputter-coated metallization films from each chip intermediate its ends, leaving the metallization films on each end thereof for electrical connection of the resulting capacitors to external electrical circuitry.

7. A process according to claim 6, wherein the chips are removed from the evacuable enclosure after forming the outermost film, placed in a second enclosure and thereafter burnished to render metallization films more solderable.

8. A process according to claim 7, wherein the first metallic material is non-magnetic nickel alloy.

9. A process according to claim 8 wherein the second metallic material is tin-lead alloy.

10. A process according to claim 9, wherein the removal of the deposited material is produced by laser trimming.

11. A process according to claim 9, wherein the removal of the deposited material is produced by an abrasive gun directing abrasive material at the portion of the capacitor intermediate the ends.

* * * * *